United States Patent [19]
Hirai

[11] Patent Number: 5,145,041
[45] Date of Patent: Sep. 8, 1992

[54] MOTION CONVERTING MECHANISM
[75] Inventor: Masanori Hirai, Gifu, Japan
[73] Assignee: Teijin Seiki Co., Ltd., Osaka, Japan
[21] Appl. No.: 707,099
[22] Filed: May 29, 1991
[30] Foreign Application Priority Data Jun. 1, 1990 [JP] Japan .................. 2-143808

[51] Int. Cl.$^5$ ............................................. F16D 65/14
[52] U.S. Cl. .................... 192/1.22; 192/1.2; 192/141
[58] Field of Search .............. 192/1.2, 1.21, 1.22, 192/141

[56] References Cited
U.S. PATENT DOCUMENTS

| | | | |
|---|---|---|---|
| 2,660,281 | 11/1953 | Ochtman | 192/141 |
| 2,763,064 | 9/1956 | Bandy | 192/141 X |
| 4,442,928 | 4/1984 | Eastman | 192/1.22 |
| 4,449,988 | 5/1984 | Redeker et al. | 192/1.2 X |
| 4,603,594 | 8/1986 | Grimm | 192/1.2 X |
| 4,733,148 | 3/1988 | Rodi | 192/1.2 X |

Primary Examiner—Leslie A. Braun
Assistant Examiner—Nicholas Whitelaw
Attorney, Agent, or Firm—Lane, Aitken & McCann

[57] ABSTRACT

A motion converting mechanism comprising a feed member provided with a screwed portion, a screw nut member engaging with the screwed portion of the feed member, a support member rotatably supporting the feed member and the screw nut member, a single drive unit for imparting a rotational motion to the feed member, and a braking unit for braking the rotational motion imparted to the screw nut member so the feed member is given a linear motion.

10 Claims, 4 Drawing Sheets

MOTION CONVERTING MECHANISM

FIELD OF THE INVENTION

The present invention relates in general to a motion converting mechanism converting a rotational motion into a linear or longitudinal feed motion, and in particular to such a mechanism which enables the output-side member to perform both a rotational motion and a linear or longitudinal feed motion.

DESCRIPTION OF THE PRIOR ART

There is known an apparatus that uses a ball screw or lead screw as a motion converting mechanism for converting a rotational motion into a linear or longitudinal feed motion. In some cases, the output-side member of the motion converting mechanism, such as the injection nozzle part of an injection-molding machine, is rotated and advanced in the longitudinal direction of the machine. The injection nozzle part of the injection-molding machine advances its screw rod in the longitudinal direction by the hydraulic cylinder to inject a molten resin into the mold and then rotates the screw rod. The rotation and feed of the drill or endmill of a cutting machine is also the same motion converting mechanism.

However, since, in the conventional motion converting mechanism such as this, drive sources such as hydraulic motors, cylinders, etc. were each provided for the rotational motion and the longitudinal motion, there was the drawback that the apparatus is of a large size, the power consumption is large and a control of interlocking the drive sources at a predetermined timing is complicated.

It is therefore an object of the present invention to provide an improved motion converting mechanism of small size and low power consumption which is capable of simply controlling its drive source.

SUMMARY OF THE INVENTION

The foregoing object is accomplished in accordance with the present invention by providing a motion converting mechanism comprising a feed member (11) provided with a screwed portion (11a), a screw nut member (12) engaging with the screwed portion (11a) of the feed member (11), a support member (18) rotatably supporting the feed member (11) and the screw nut member (12), single drive means (22) for imparting a rotational motion to the feed member (11), and braking means (34, 47, 53) for braking the rotational motion imparted to the screw nut member (12) so the the feed member (11) is given a linear motion.

The braking means (34) may comprise an electromagnetic brake (33) and a gear (32) connected with the brake (33) and engaged by the screw nut member (12), and the single drive means may comprise an electric motor (22).

The motion converting mechanism may further comprise a first rotational position detector (41) connected to the motor (22) and outputting a feedback signal, a motor controller (42) to which the feedback signal is inputted and by which the motor (22) is servo controlled, a second rotational position detector (44) connected to the gear (32) and outputting a position signal, and an electromagnetic brake controller (45) to which the position signal is inputted and which controls the electromagnetic brake (33) according to the position signal. As a result, the brake (33) can be engaged and disengaged, and also can produce a variable braking torque to be imparted to the screw nut member (12), when the brake is engaged.

The above braking means (53) may comprise a torque limiter (51) and a gear (32) connected with the torque limiter (51) and engaged by the screw nut member (12). The motion converting mechanism may also further comprise a first rotational position detector (41) connected to the motor (22) and outputting a feedback signal, a motor controller (42) to which the feedback signal is inputted and by which the motor (22) is servo controlled, a second rotational position detector (44) connected to the gear (32), and a torque limiter controller (52) by which a limit value of a braking torque that is imparted to the screw nut member (12) by the torque limiter (51) is variably controlled based on a position signal of the second rotational position detector (44).

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
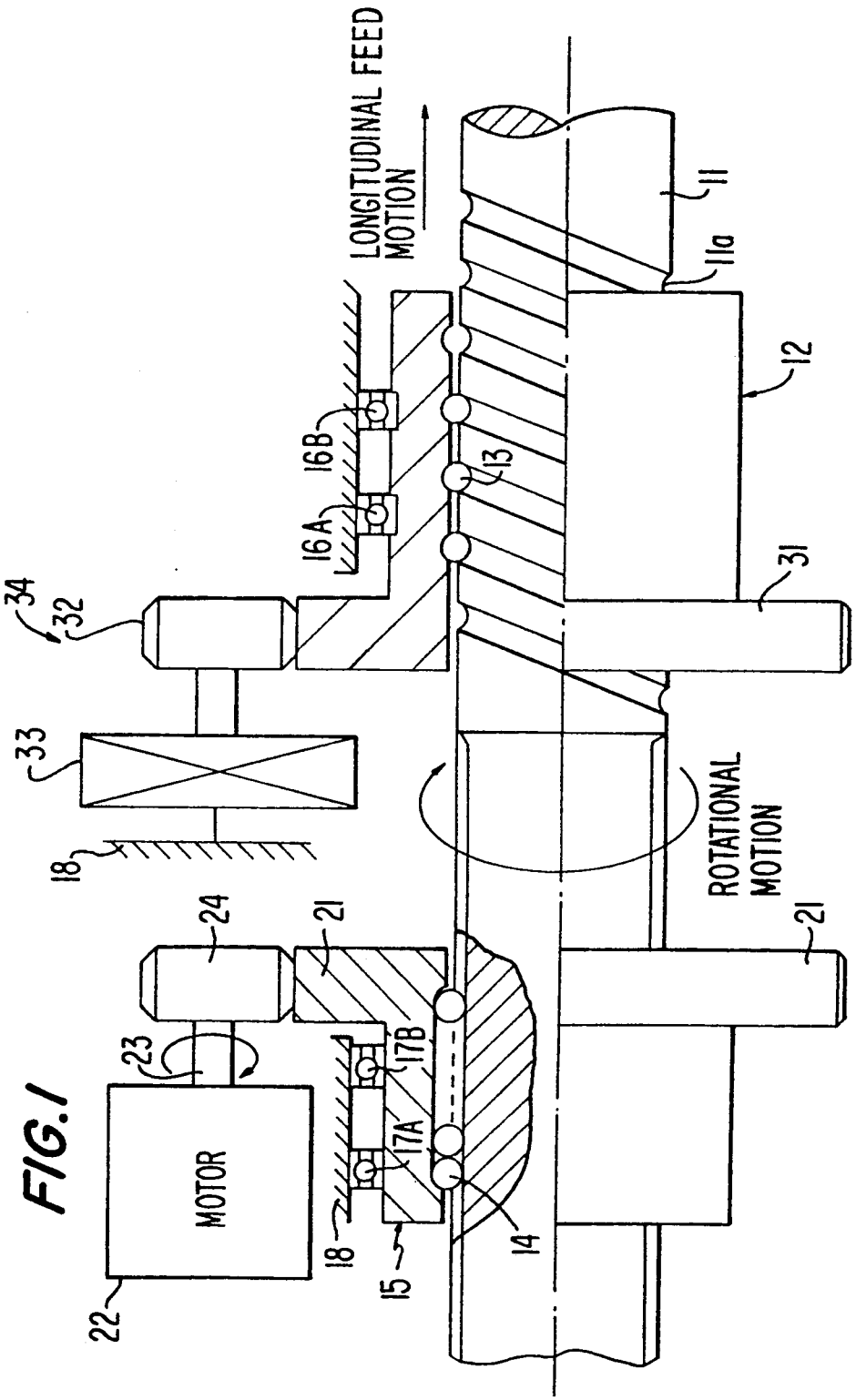
FIG. 1 is a schematic view showing an embodiment of the motion converting mechanism according to the present invention.

Referring to FIG. 1, there is shown a preferred embodiment of the motion converting mechanism in accordance with the present invention.

In FIG. 1, reference numeral 11 denotes a feed bar member 11 provided with a screwed portion 11a and reference numeral 12 denotes a screw nut member. The feed bar member 11 is, for example, connected with the drill of a cutting machine (not shown) and performs the rotation and feed actuation of this drill. The screwed portion 11a of the feed bar member 11 engages with the screw nut member 12 through a plurality of balls 13, and the feed bar member 11 is further ball-spline coupled with an annular member 15 through a plurality of balls 14. The screw nut member 12 and the annular member 15 are freely rotatably supported on a support structure 18 through a pair of bearings 16A and 16B and a pair of bearings 17A and 17B, respectively. Consequently, the feed bar member 11 is also freely rotatably supported on the support structure 18.

The annular member 15 is formed with a gear portion 21 of the spur gear type meshing with a gear 24 fixedly mounted on the output shaft 23 of an electric motor 22. The motor 22 is supported on the support structure 18, and is turned on and off by means of a control circuit (not shown), so that the feed bar member 11 is rotated and stopped through the gear 24 and the annular member 15. The screw nut member 12 is also rotated and stopped by the same motor 22, because the screw nut member 12 is engaged by the feed bar member 11 and freely rotatably supported on the support member 18.

The screw nut member 12 is likewise formed with a driven gear portion 31 of the spur gear type meshing with a drive gear 32. The drive gear 32 is attached to a friction element 33 (hereinafter referred to as a clutch/brake) which serves as a clutch or brake, such as an electromagnetic clutch. The clutch/brake 33 controls braking of the screw nut member 12 through the drive gear 32 and is engaged and disengaged by turning it on and off by, for example, a known ON/OFF control circuit (not shown). The clutch/brake 33 and the drive gear 32 is provided between the support structure 18 and the screw nut member 12 and as a whole constitute braking control means 34 for controlling braking of the rotational motion of the screw nut member 12.

The operation of the embodiment of FIG. 1 will hereinafter be described.

In this embodiment, as the clutch/brake 33 is engaged and disengaged, the motion state of the feed bar member 11 changes.

If it is now assumed that the clutch/brake 33 is in its fully disengaged state, the drive gear 32 connected to the clutch/brake 33 and the gear portion 31 of the screw nut member 12 will become freely rotatable. If the motor 22 is driven, the feed bar member 11 rotates, but there is no relative rotation between the feed bar member 11 and the screw nut member 12. Therefore, under this condition, the feed bar member 11 does not perform a longitudinal feed motion, and the feeding operation of the drill connected with the feed bar member 11 is not performed.

Then, if the clutch/brake 33 is energized and a braking torque is exerted on the driven gear portion 31 of the screw nut member 12 through the drive gear 32, the feed bar member 11 is rotated with respect to the screw nut member 12 in proportion to the magnitude of the braking torque. The relative rotation of the feed bar member 11 with respect to the number 12 causes the member 11 to move axially, so that the drill is fed and a predetermined cutting operation is performed. With a simple control that the motor 22 and the clutch/brake are turned on and off, the feed bar member 11 can be rotated and moved linearly, as occasion demands.

Thus, in the embodiment of FIG. 1, depending upon the braking control state of the braking control means, the feed bar member 11 and the screw nut member 12 rotate relatively, so that the feed bar member 11 performs both a rotational motion and a longitudinal feed motion. Therefore, there is provided, in accordance with the present invention, a motion converting mechanism of small size and low power consumption in which the feed bar member is rotated and moved axially by means of a simple ON and OFF control of the motor 22 and the clutch/brake 33.

Figure 2:
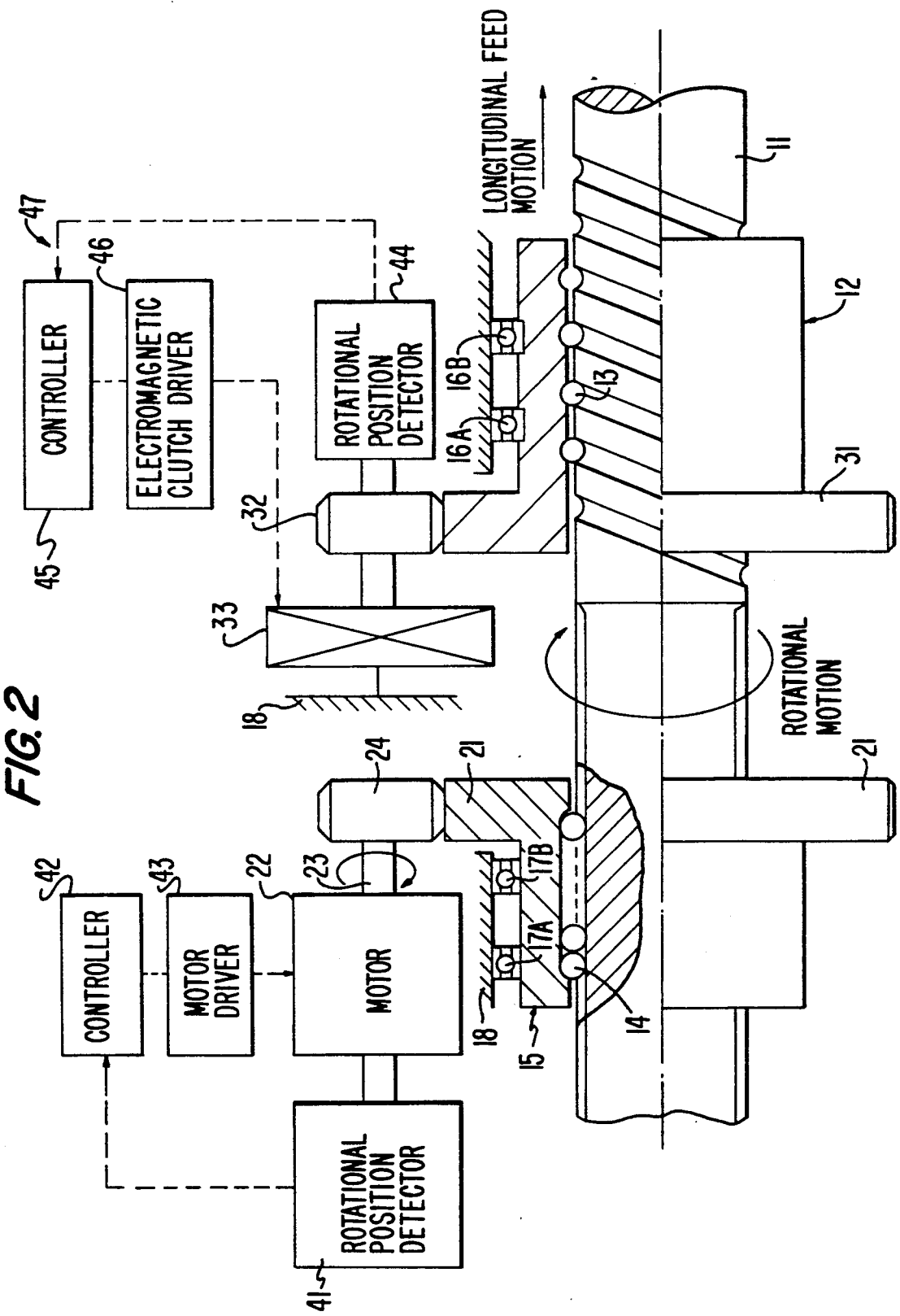
FIG. 2 is a schematic view showing another embodiment of the motion converting mechanism according to the present invention.

FIG. 2 schematically illustrates another embodiment of the motion converting mechanism according to the present invention. The same reference numerals will be applied to the parts substantially identical to corresponding parts of the FIG. 1 embodiment and therefore a description of the corresponding parts will not be given.

In the embodiment of FIG. 2, a rotational position detector 41 is coupled to a motor 22 and outputs a detection signal (feedback signal) corresponding to the detected rotational position of the motor 22 to a controller 42. In response to the detection signal, the controller 42 outputs a motor control signal to a motor driver 43 by which the motor 22 is servo controlled. A second rotational position detector 44 is coupled to a drive gear 32 meshing with a screw nut member 12 and outputs a detection signal to a second controller 45. In response to the detection signal from the second rotational position detector 44, the second controller 45 outputs a clutch control signal to an electromagnetic clutch driver 46 by which a clutch/brake 33 is controlled. The electromagnetic clutch driver 46 is provided with a pulse width modulation (PWM) control circuit for controlling a power supply to the clutch/brake 33 according to the clutch control signal from the second controller 45. By this PWM control circuit, the drive voltage of the clutch/brake 33 is controlled according to the time ratio of a power supply, and the clutch/brake 33 produces a variable braking torque corresponding to the drive voltage. The drive gear 32, clutch/brake 33, controller 45 and the electromagnetic clutch driver 46 as a whole constitute braking control means 47. In addition to the same effect as that of the embodiment of FIG. 1, the braking torque control can be more accurately performed by the drive voltage control of the clutch/brake 33 in the embodiment of FIG. 2. Therefore, a feed bar member 11 that performs the feed motion of a drill (not shown) is rotated and axially moved at a desired speed, so that the number of rotations of the drill and the feed speed thereof can be controlled simply and variably.

Figure 3:
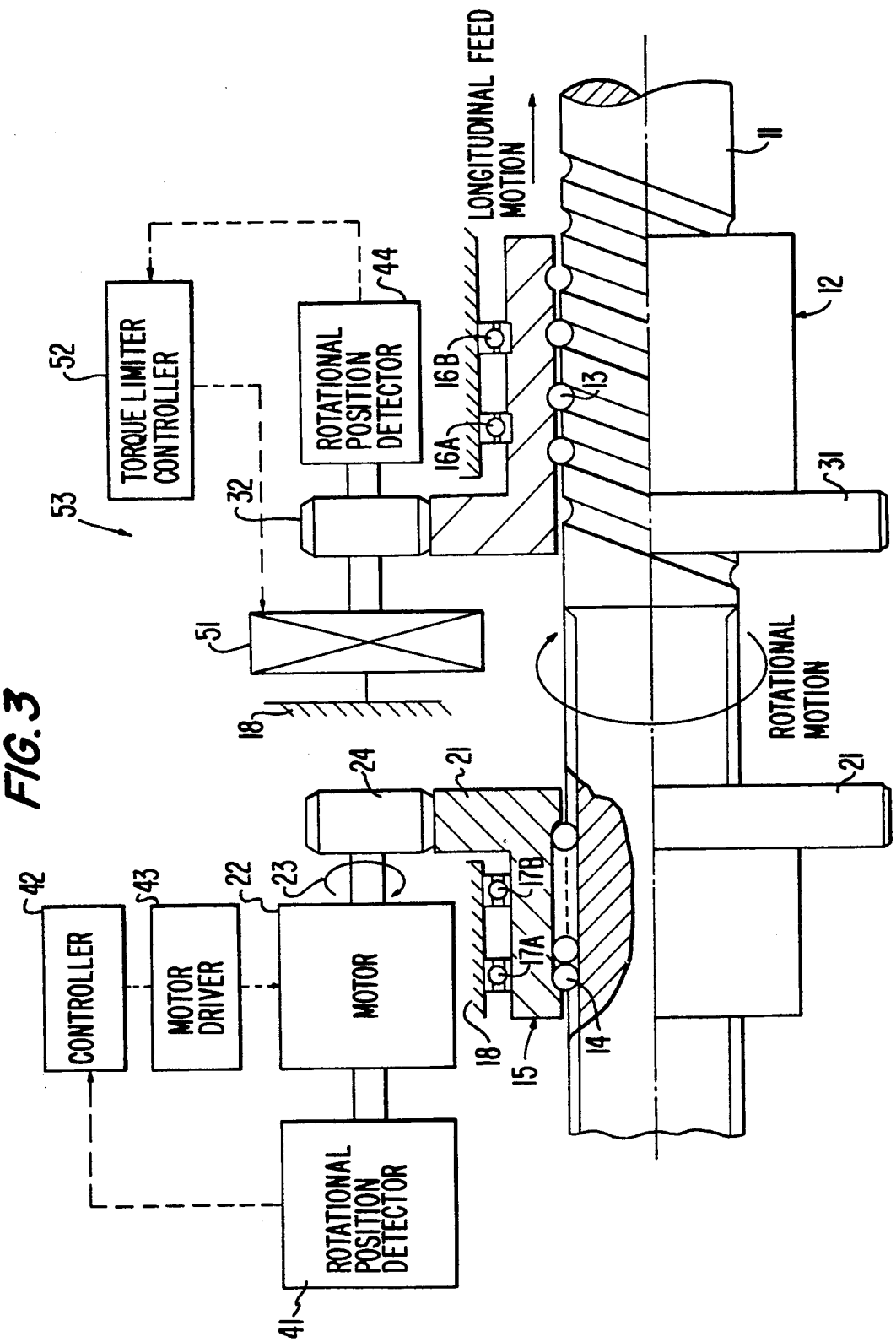
FIG. 3 is a schematic view showing a third embodiment of the motion converting mechanism according to the present invention.

FIG. 3 schematically illustrates a third embodiment of the motion converting mechanism constructed in accordance with the present invention. The same reference numerals will be applied to the pars substantially identical to corresponding parts of the FIG. 1 embodiment and therefore a description of the corresponding pars will not be given.

In the third embodiment, instead of the clutch/brake 33 of the embodiments of FIGS. 1 and 2, a know torque limiter 51 is provided between a support structure 18 and a drive gear 32. On the basis of the position signal of a rotational position detector 44, a torque limiter controller 52 variably controls the limit value of a braking torque, which is imparted to the screw nut member 12 by the torque limiter 51, as required. Therefore, braking control means 53 in the third embodiment is constituted by the gear 32, torque limiter 51 and the torque limiter controller 52.

By accurately controlling the braking torque of the screw nut member 12 by the braking control means 53, the third embodiment also enables the feed bar member 11 to rotate and axially move, and the same effect as that of the second embodiment of FIG. 2 can be obtained.

Figure 4:
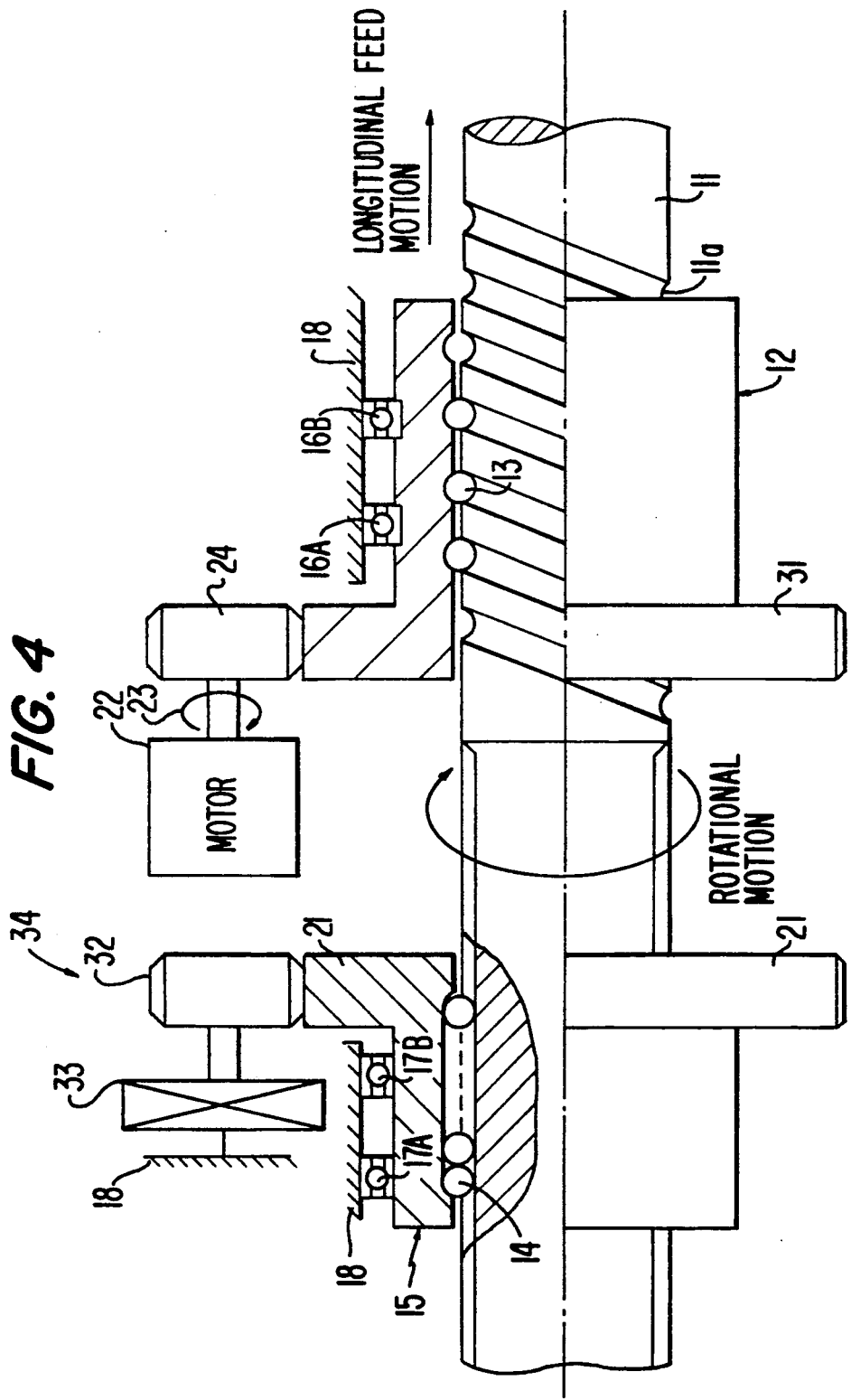
FIG. 4 is a schematic view showing a fourth embodiment of the motion converting mechanism according to the present invention.

While in the embodiments of the present invention it has been described that the feed bar member 11 is connected with the drill of a cutting machine, it is noted that the present invention is also applicable to various kinds of members that require a rotational motion and a linear motion, such as the screw rod of an injection-molding machine, etc. Also, although in the embodiments the feed bar member 11 is driven by means of the motor 22 through the spur gear 21 and the braking control means 34, 47 or 53 is provided between the support structure 18 and the spur gear 31, it is noted that the feed bar member 11 may also be driven by means of the motor 22 through the spur gear 31 and the braking control means 34, 47 or 53 may also be provided between the support structure 18 and the spur gear 21 as shown in FIG. 4.

While certain representative embodiments and details have been shown for the purpose of illustrating the invention, it will be apparent to those skilled in this art that various changes and modifications may be made therein without departing from the scope of the invention.

What I claim is:

1. A motion converting mechanism comprising:
   a feed member provided with a screwed portion;
   a screw nut member engaging with said screwed portion of said feed member;
   a support member rotatably supporting said feed member and said screw nut member;
   single drive means for imparting a rotational motion to said feed member; and
   a releasable braking means operatively connected to said screw nut member for braking said rotational motion imparted to said screw nut member so the said feed member is given a linear motion.

2. A motion converting mechanism as set forth in claim 1, wherein said braking means comprises an electromagnetic brake and a gear connected with said brake and engaged by said screw nut member and wherein said single drive means comprises an electric motor.

3. A motion converting mechanism as set forth in claim 2, which further comprises:
   a first rotational position detector connected to said motor and outputting a feedback signal;
   a motor controller to which said feedback signal is inputted and by which said motor is servo controlled;
   a second rotational position detector connected to said gear and outputting a position signal; and
   an electromagnetic brake controller to which said position signal is inputted and which controls said electromagnetic brake according to said position signal.

4. A motion converting mechanism as set forth in claim 1, wherein said braking means comprises a torque limiter and a gear connected with said torque limiter and engaged by said screw nut member and wherein said single drive means comprises an electric motor.

5. A motion converting mechanism as set forth in claim 4, which further comprises:
   a first rotational position detector connected to said motor and outputting a feedback signal;
   a motor controller to which said feedback signal is inputted and by which said motor is servo controlled;
   a second rotational position detector connected to said gear; and
   a torque limiter controller by which a limit value of a braking torque that is imparted to said screw nut member by said torque limiter is variably controlled based on a position signal of said second rotational position detector.

6. A motion converting mechanism as set forth in claim 1, wherein said feed bar member is connected to a drill of a cutting machine.

7. A motion converting mechanism as set forth in claim 1, wherein said feed bar member is connected to a screw rod of an injection-molding machine.

8. A motion converting mechanism comprising:
   a feed member provided with a screwed portion;
   a screw nut member engaging with said screwed portion of said feed member;
   a support member rotatably supporting said feed member and said screw nut member;
   single drive means for imparting a rotational motion to said feed member and to said screw nut member; and
   a releasable braking means operatively connected to one of said screw nut member and said feed member for braking one of said rotational motion imparted to said screw nut member and said rotational motion imparted to said feed member.

9. A motion converting mechanism as set forth in claim 8, wherein said braking means is provided between said feed member and said support member.

10. A motion converting mechanism as set forth in claim 8, wherein said braking means is provided between said screw nut member and said support member.

* * * * *